Patented Sept. 30, 1941

2,257,699

UNITED STATES PATENT OFFICE 2,257,699

LUMINESCENT MATERIAL

Alfred Hamilton McKeag and Peter Whitten Ranby, North Wembley, England, assignors to General Electric Company, a corporation of New York No Drawing. Application May 9, 1940, Serial No. 334,268. In Great Britain February 20, 1939

8 Claims. (Cl. 250—81)

This invention relates to luminescent materials, to their manufacture and to combinations of luminescent materials with means (especially electric discharge devices) adapted to excite them to luminescence. The object of the invention is to produce a luminescent material that differs in either constitution or luminescent properties or both from known luminescent material.

One of the best known luminescent materials is calcium tungstate, $CaWO_4$. It appears now to be generally believed that an activator is not necessary to its luminescence; but both lead and samarium have been proposed as activators, and their presence is sometimes beneficial. Under radiation of wave-length 2537 A. U. (and many other excitations) calcium tungstate unactivated or activated with lead emits blue light; activated with samarium it emits pinkish-blue light; whether activated or unactivated it is very little excited, if at all, by radiation of wave-length 3650 A. U. It has been proposed to mix luminescent calcium tungstate with basic oxides, especially those of calcium and magnesium and other bivalent metals; but in these proposals it has not been suggested that this admixture changes the constitution of the tungstate or alters materially the colour of the luminescent light; the object of the admixture is to preserve the luminescence against agents apt to destroy it, such as reducing gases and mercury vapour in a discharge tube.

We have discovered that, by heating calcium tungstate with suitable quantities of (1) calcium oxide, (2) the oxide of another bivalent metal, and (3) an activator, preferably uranium or bismuth, luminescent materials can be produced very different from known luminescent calcium tungstate. The bivalent metal that has been found most suitable is magnesium; but strontium, barium, zinc and beryllium have all been found to be possible substitutes for magnesium. In view of the prevailing uncertainty of the role of "activators", we here explain that, hereinafter, in calling a substance an activator, we imply no more than that (1) there is substantially no luminescence in its absence, (2) the amount of it necessary to produce luminescence is not more than a few per cent by weight of the whole material, (3) that its presence, in an amount sufficient for it to produce luminescence, makes little or no appreciable difference to the form or to the dimensions of the main lattice structure as determined by X-ray analysis.

The luminescent light excited in the new materials by all the agencies that we have examined is green, if the activator is uranium, and yellow, if the activator is bismuth; it is thus always very different from the light excited in known unactivated calcium tungstate by radiation of wave-length 2537 A. U. If the activator is uranium, luminescence can be excited by radiation of wave-length 3650 A. U. or 2537 A. U. or 1.5 A. U. and by cathode rays of about 3000 electron-volt energy. If the material, activated by uranium, is sufficiently free from the usual noxious impurities, notably iron, it is also excited by contact with a discharge through neon, which probably implies excitation by the resonance radiation of neon in the neighbourhood of 736 A. U. If the activator is bismuth, luminescence can be excited by radiation of wave-length 3650 A. U. or 1.5 A. U., but hardly at all by radiation of wave-length 2537 A. U., by contact with the neon discharge, or by cathode-rays of the said energy. These statements will indicate to those skilled in the art what agencies other than those named are likely to excite the materials.

Since the materials are all excited by radiation of wave-length 3650 A. U., they can be used as substitutes for the known luminescent sulphides in many of their applications. In all the samples that we have prepared, the efficiency of the excitation by such radiation is less than that of the well-known sulphides, giving yellow or green luminescent light; but the new materials have the advantage over the sulphides that they are far less chemically reactive and will retain their luminescence in conditions in which the sulphides rapidly lose theirs.

The aforesaid method of preparing the new luminescent materials suggests that they arise from some chemical compound $(CaO)_n(WO_3)_m$, where $n$ is greater than $m$, by the partial replacement of the calcium by another bivalent metal. This suggestion is confirmed by X-ray analysis. In the following table are given in conventional form the X-ray spacings of three materials, designated as I, II, III. In each column the main figure is the spacing in A. U. between the atomic planes generating an observed line, calculated on the assumption that all reflections are of the first order; the figure in brackets gives the intensity of the line, estimated visually. The materials I, II, III were prepared in a manner described more fully hereinafter. Here it is sufficient to say that in each case an oxide was heated with calcium tungstate and a small quantity of uranium salt (as already indicated, omission of the uranium could not have changed the spacings materially); in material I this oxide was calcium oxide only; in materials II and III, it was a mixture of calcium oxide with magnesium oxide and strontium oxide respectively. Thus, if the said suggestion is true, material I should give the spacings of the compound $$(CaO)_n(WO_3)_m$$

whilst materials II and III should give the spacing when some of the calcium is replaced by other elements.

| I Calcium | II Ca/Mg | III Ca/Sr |
|---|---|---|
| 4.68 (8) | } 4.43 (10) | 4.71 (7) |
| 4.55 (6) | | |
| 3.99 (8) | 3.85 (6) | 4.10 (4) |
| 2.888 (1) | 3 44 (1) | 3.64 (1) |
| 2.814 (4) | } 2.716 (10) | 2.882 (10) |
| 2.757 (10) | | |
| 2.432 (2) | | |
| 2.380 (3) | } 2.316 (8) | 2.463 (6) |
| 2.332 (5) | | |
| | 2.242 (1) | |
| 2.264 (1) | 2.216 (1) | |
| 2.209 (1) | 2.131 (1) | |
| 1.991 (8) | 1.923 (7) | 2.042 (8) |
| 1.869 (1) | 1.786 (1) | |
| 1.840 (3) | 1.770 (3) | } 1.874 (3) |
| 1.813 (4) | 1.757 (3) | |
| | 1.741 (1) | } 1.828 (2) |
| 1.780 (5) | 1.716 (5) | |
| | | 1.795 (2) |
| 1.651 (5) | 1.585 (5) | |
| 1.635 (3) | 1.574 (2) | } 1.666 (8) |
| 1.605 (6) | 1.562 (6) | |
| 1.548 (2) | 1.492 (3) | } 1.524 (1) |
| 1.526 (2) | 1.477 (3) | |
| | 1.439 (1) | |
| 1.440 (1) | 1.380 (2) | |
| 1.408 (4) | 1.359 (4) | 1.445 (5) |
| | 1.348 (1) | |
| 1.357 (1) | 1.318 (2) | |
| 1.355 (3) | 1.305 (2) | 1.382 (2) |
| 1.341 (3) | 1.298 (3) | |
| | | 1.292 (4) |

The spacings are entirely different from those of known luminescent calcium tungstate. We have not succeeded in finding an atomic arrangement that gives such spacings accurately. But it may be noted that there is some indication of rhombohedral-hexagonal symmetry and that, if the symmetry were rhombohedral-hexagonal, it would approach the limit in which rhombohedral-hexagonal becomes cubic symmetry, especially in the material III, where single lines (or rather lines inseparable in these measurements) correspond with a group of lines in material I. But the most important feature to be observed is that (with a few exceptions which may be due to impurities) the differences between the three sets of spacings are of the kind characteristic of the differences between members of the same series of solid solutions, that is to say, all three sets indicate the same atomic arrangement and the differences indicate variations only in respect of the small number of parameters characteristic of that arrangement. This is exactly what would be expected if the said suggestion be correct.

Of the three materials, material I is not appreciably luminescent and therefore is not a luminescent material according to the invention; material III is definitely luminescent, but the efficiency of its luminescence is much less than that of material II.

According to one aspect of the invention a luminescent material (1) contains calcium and tungsten and oxygen and at least one bivalent metal M, other than calcium, in proportions such that the sum of the number of Ca atoms and the number of M atoms exceeds the number of W atoms, (2) has a lattice structure in which the said elements are arranged so as to give X-ray spacings that are substantially either those of one of the materials II and III aforesaid or differ from these as the spacings characteristic of one member of a series of solid solutions differ from those characteristic of another member of the same series, (3) contains an activator (preferably uranium or bismuth or both), and (4) under excitation by radiation of wave-length 3650 A. U. emits light of colour very different from that characteristic of known unactivated calcium tungstate excited by radiation of wave-length 2537 A. U.

The term "substantially" is inserted in the phrase (2) to indicate that differences in X-ray spacings are to be ignored which, in the present art of X-ray analysis, do not imply differences in the lattice structure. Thus any spacing that is due to accidental and inessential impurities is to be ignored. Again, so long as the conditions laid down in phrase (2) for the X-ray spacings are fulfilled, the lattice structure may contain elements other than those named in phrase (1). There is evidence that a considerable amount of bismuth may be present in the material (as lead may be present in known luminescent calcium tungstate) without changing the lattice structure otherwise than by change of the said parameters and without destroying the characteristic luminescence, and that the presence of bismuth in excess of the amount required to produce luminescence may be beneficial.

In all the methods by which we have prepared the new materials, there have been heated together (a) calcium oxide CaO, (b) either calcium tungstate (CaWO4) or a tungstate (MWO4) of some other bivalent metal M other than calcium or tungsten oxide (WO3) or more than one of these materials, (c) an oxide (M'O) of one or more bivalent metals M' other than calcium, where M' may or may not be the same as M, with the proviso that ingredient (c) may be absent if a tungstate MWO4 is present in ingredient (b), and (d) either uranium or bismuth, preferably in the combined state, or both; the properties of the ingredients (a), (b), (c) being such that the number of Ca atoms $(n_1)$ + the number of M atoms $(n_2)$ + the number of M' atoms (if present) $(n_3)$ considerably exceeds the number of W atoms $(m)$. It is not necessary or usually desirable that all the ingredients (a), (b), (c), (d) should be heated together at the same time; thus, two ingredients may be heated together, a third heated with the product and so on.

According to another aspect of the invention a luminescent material is prepared by heating together ingredients (a), (b), (c), (d) as aforesaid so as to produce a product which, under excitation by radiation of wave-length 3650 A. U., emits yellow or green light.

As indicated already, it is preferable that M, and also M' if (c) is present, should be magnesium. It is also preferable that $(n_1+n_2+n_3)/m$ should lie near 3, (i. e. between 2.5 and 3.5), and that $n_1$ should exceed $(n_2+n_3)$. When M (and M' if present) is magnesium, the most favourable proportion appears to be near 2CaO:1MgO:1WO3.

As would be expected from the need for an activator, greater care has to be exercised in securing starting materials free from noxious impurities than is necessary in the preparation of the known calcium tungstate; but other ingredients (e. g. known fluxes) may be added.

Methods of preparing luminescent materials according to the invention will now be described in detail by way of example. The first two methods, both using magnesium as the bivalent metal other than calcium and differing only in the activator, are the best that we have discovered for preparing luminescent materials according to the invention and we know of no reason why any other method should be used, unless possibly if a colour be required intermediate between the yellow of uranium and the green of bismuth; then a mixture of the two activators might be used, the remainder of the process being unchanged.

The materials mentioned are all of high grade. In the first method 450 gm. (or 380 gm.) of calcium (or magnesium) chloride are dissolved in 2 litres of distilled water, and purified by the addition of 15 ml. of ammonium sulphide solution (ordinary laboratory reagent); any precipitate is filtered off. 376 gm. of ammonium carbonate are dissolved in two litres of distilled water and are similarly purified. The two solutions are mixed; the precipitate of calcium (or magnesium) carbonate is filtered off, washed six times with distilled water, dried at 180° C. for ten hours, ground thoroughly and heated to 1000° C. (or 600° C.) till completely converted to calcium (or magnesium) oxide.

Highly purified calcium tungstate is prepared in known manner by heating together calcium oxide prepared as aforesaid with highly purified tungstic oxide.

14 gm. of the calcium oxide and 72 gm. of the calcium tungstate are intimately mixed dry and heated at 1100° C. in air for one hour. 0.82 gm. uranyl nitrate is dissolved in sufficient distilled water to form a paste with the dry powder; the paste is then dried at 180° C. The mixture is ground, heated at 1100° C. in air for one hour, and ground again. 10 gm. of the magnesium oxide is mixed intimately with the dry powder and the mixture heated again in air at 1100° C. for one hour. 0.1% by weight of the purest boric acid (serving as a flux) is added in solution; after drying, the mixture is heated again in air to 1100° C. for two hours. The resulting material is washed six times with distilled water, dried and sieved.

The resulting material is that described hereinbefore as material II; its composition is approximately $2CaO: 1MgO: 1WO_3$; it contains 0.44% by weight of U.

In the second method, everything is the same except that the uranium is replaced by bismuth added as chloride. 1% of bismuth metal is sufficient to produce a strong luminescence; but a slight improvement is produced by using 5-10% of bismuth metal. This is an example of the action of bismuth as an ingredient other than an activator, which was referred to above. The resulting material will hereinafter be called IIb.

The material III aforesaid was prepared by a method differing from that by which material II was prepared only in the use, in place of magnesium, of a molecularly equivalent amount of strontium. It is important to insist again that, so far as we are aware, the material III, or other materials in which bivalent metals other than magnesium replace magnesium, have no advantage over those prepared by the said first two methods.

According to a third aspect of the invention, in a combination of luminescent material with means for exciting it to luminescence, the said luminescent material is, or comprises, luminescent material according to one or both of the aforesaid aspects of the invention. The term "comprises" is used in order to indicate, in accordance with the conventions of the art, that a luminescent material does not cease to be itself merely because it is mixed with other material, luminescent or non-luminescent, so long as it retains in the mixture its characteristic lattice structure and luminescent properties.

As already indicated, one of the uses of luminescent materials according to the invention is to act as substitutes for the luminescent sulphides that give luminescent light of approximately the same colour under the same excitation. Accordingly many combinations according to the third aspect of the invention will differ from known combinations only in the replacement of a luminescent sulphide by luminescent material according to the invention. It is to be observed that, since luminescent material according to the invention is excited by radiation of wave-length 3650 A. U., it can, like the said luminescent sulphides, be separated from a source of exciting radiation, e. g. a discharge through mercury vapour, by a reasonable thickness of ordinary glass.

If the combination is a cathode-ray tube of which the luminescent material forms the screen, the material must be activated by uranium, not by bismuth.

One combination, however, needs particular mention. It is a neon discharge tube coated on the interior with luminescent material according to the invention, activated by uranium. In such a combination the said luminescent material is not a substitute for luminescent sulphide; for, as is well known, the sulphides are little, if at all, excited by contact with a neon discharge.

We claim:

1. A luminescent material comprising a tungstate of calcium and at least one other bivalent metal of the group consisting of magnesium, strontium, barium, zinc and beryllium and in which the sum of the number of calcium atoms and the number of atoms of the bivalent metal exceeds the number of tungsten atoms, said material having a lattice structure in which the said elements are so arranged as to substantially conform to the following X-ray spacings:

| Spacing | Intensity |
|---|---|
| 4.43 | 10 |
| 3.85 | 6 |
| 3.44 | 1 |
| 2.716 | 10 |
| 2.316 | 8 |
| 2.242 | 1 |
| 2.216 | 1 |
| 2.131 | 1 |
| 1.923 | 7 |
| 1.786 | 1 |
| 1.770 | 3 |
| 1.757 | 3 |
| 1.741 | 1 |
| 1.716 | 5 |
| 1.585 | 5 |
| 1.574 | 2 |
| 1.562 | 6 |
| 1.492 | 3 |
| 1.477 | 3 |
| 1.439 | 1 |
| 1.380 | 2 |
| 1.359 | 4 |
| 1.348 | 1 |
| 1.318 | 2 |
| 1.305 | 2 |
| 1.298 | 3 | said material also containing an activator.

2. A luminescent material comprising a tungstate of calcium and at least one other bivalent metal of the group consisting of magnesium, strontium, barium, zinc and beryllium and in which the sum of the number of calcium atoms and the number of atoms of the bivalent metal exceeds the number of tungsten atoms, said material having a lattice structure in which the said elements are so arranged as to substantially conform to the following X-ray spacings:

| Spacing | Intensity |
| --- | --- |
| 4.71 | 7 |
| 4.10 | 4 |
| 3.64 | 1 |
| 2.882 | 10 |
| 2.463 | 6 |
| 2.042 | 8 |
| 1.874 | 3 |
| 1.828 | 2 |
| 1.795 | 2 |
| 1.666 | 8 |
| 1.524 | 1 |
| 1.445 | 5 |
| 1.382 | 2 |
| 1.292 | 4 | said material also containing an activator.

3. A luminescent material comprising a tungstate of calcium and at least one other bivalent metal of the group consisting of magnesium, strontium, barium, zinc and beryllium and in which the sum of the number of calcium atoms and the number of atoms of the said other bivalent metal exceeds the number of tungsten atoms, activated by at least one of the metals of the group consisting of uranium and bismuth.

4. A luminescent material comprising a tungstate of calcium and magnesium, in which the sum of the number of calcium atoms and the number of magnesium atoms exceeds the number of tungsten atoms, said material containing uranium as an activator.

5. A luminescent material comprising a tungstate of calcium and magnesium, in which the sum of the number of calcium atoms and the number of magnesium atoms exceeds the number of tungsten atoms, said material containing bismuth as an activator.

6. A luminescent material comprising a tungstate of calcium and at least one other bivalent metal of the group consisting of magnesium, strontium, barium, zinc and beryllium and in which the sum of the number of calcium atoms and the number of atoms of the said other bivalent metal exceeds the number of tungsten atoms, said material containing a mixture of uranium and bismuth as an activator.

7. A luminescent material comprising a tungstate of calcium and at least one other bivalent metal of the group consisting of magnesium, strontium, barium, zinc and beryllium and in which the sum of the number of calcium atoms and the number of atoms of the said other bivalent metal exceeds the number of tungsten atoms, activated by at least one of the metals of the group consisting of uranium and bismuth, said material having a lattice structure in which the arrangement of the said elements gives X-ray spacings of from 4.71 to 1.292 A. U. between the atomic planes generating an observed line, all reflections being of the first order.

8. A luminescent material comprising a tungstate of calcium and at least one other bivalent metal of the group consisting of magnesium, strontium, barium, zinc and beryllium and in which the sum of the number of calcium atoms and the number of atoms of the said other bivalent metal exceeds the number of tungsten atoms, activated by at least one of the metals of the group consisting of uranium and bismuth, said material having, apart from the activator, the composition $(CaO)_{n_1}.(MgO)_{n_2}.(WO_3)_m$, where $(n_1+n_2)/m$ is between 2.5 and 3.5 and $n_1$ exceeds $n_2$.

ALFRED HAMILTON McKEAG.
PETER WHITTEN RANBY.